United States Patent [19]

Druke et al.

[11] Patent Number: 4,736,287

[45] Date of Patent: Apr. 5, 1988

[54] SET ASSOCIATION MEMORY SYSTEM

[75] Inventors: Michael B. Druke, Sunnyvale; Walter A. Wallach, San Jose, both of Calif.

[73] Assignee: Rational, Mountain View, Calif.

[21] Appl. No.: 930,861

[22] Filed: Nov. 14, 1986

Related U.S. Application Data

[63] Continuation of Ser. No. 506,052, Jun. 20, 1983, abandoned.

[51] Int. Cl.$^4$ .............................................. G06F 9/26
[52] U.S. Cl. ...................................................... 364/200
[58] Field of Search ... 364/200 MS File, 900 MS File

[56] References Cited

U.S. PATENT DOCUMENTS

| | | | |
|---|---|---|---|
| 4,077,059 | 2/1978 | Cordi et al. | 364/200 |
| 4,096,573 | 6/1978 | Heller et al. | 364/200 |
| 4,156,905 | 5/1979 | Fassbender | 364/200 |
| 4,277,826 | 7/1981 | Collins et al. | 364/200 |
| 4,420,807 | 12/1983 | Nolta et al. | 364/200 |
| 4,464,713 | 8/1984 | Benhase et al. | 364/200 |

FOREIGN PATENT DOCUMENTS

| | | | |
|---|---|---|---|
| 0109298 | 11/1983 | European Pat. Off. | 70/100 |
| 1547942 | 7/1979 | United Kingdom | 131/315 |
| 1580415 | 12/1980 | United Kingdom | 200/48 R |
| 2092785 | 1/1982 | United Kingdom | 362/32 |

*Primary Examiner*—David Y. Eng
*Attorney, Agent, or Firm*—Blakely, Sokoloff, Taylor & Zafman

[57] ABSTRACT

A memory system for use in a computer which in the preferred embodiment provides two megabytes of capacity per board (up to four boards) is disclosed. An ALU generates an address signal which selects a number of set locations in the main memory. Simultaneously, a portion of the address field is fed to a set association logic circuit for parallel processing. The set association circuit contains tag storage memories and comparators which store tag values. These values are compared with address fields, and if a match occurs, one of the comparators selects a 128-bit word from the main memory. A hash function is also used to provide for dispersal of storage locations to reduce the number of collisions of frequently used addresses. Because of hardware implementation of hashing and least recently used (LRU) algorithm, a constant predetermined cycle time is realized since all accessing functions occur substantially in parallel. Several sets of data are accessed simultaneously while a set association process is performed which selects one of the accessed sets, wherein access time is reduced because of the parallel accessing.

20 Claims, 4 Drawing Sheets

SET ASSOCIATION MEMORY SYSTEM

This is a continuation of application Ser. No. 506,052, filed June 20, 1983, now abandoned.

BACKGROUND OF THE INVENTION

1. Field of the Invention

The invention relates to a memory system for use in digital computers.

2. Prior Art

Countless memory systems are known for permitting a processing means (e.g., central processing unit, arithmetic logic unit, etc.) to select locations in a random-access memory (RAM). For purposes of discussion, and recognizing the pitfalls in characterizing memory systems, the prior art is briefly discussed in two general categories. One category (non-virtual memories) receives a logical address and employs some means such as an address extender technique, memory management unit (MMU), bank switching, etc., to provide a larger, physical address for addressing a RAM. In the second category, a larger logical address from the processing means is translated to a generally smaller, physical address for accessing the RAM. As will be seen, the present invention is more like the second category of memory systems than the first.

The first category of memory systems is typically used by microprocessors, and the like, and often uses an MMU. This unit receives a portion of the logical address and provides a portion of the physical address. For the mapping provided with this non-virtual storage, a physical address exists for each logical address.

In the second category, often two memories for storing data are employed. One, commonly referred to as a data cache, is a smaller, higher speed RAM (e.g., employing static devices and having a system cycle time of approximately 200 nsec.). Data frequently addressed by the processing means is stored in the data cache memory. A larger RAM (e.g., dynamic devices with system cycle times of 1-2 micro sec.) provides the bulk of the RAM storage. In a typical process, usually more than 90% of the time, data sought by the processing means is in the data cache and if not there, much greater than 99% of the time the data is in the dynamic RAM. A fast memory (address translation unit (ATU) or translation look-aside buffer) is used to examine addresses from the processing means and for providing addresses for the RAMs. As many as three *serial* accesses can be required with this arrangement. The effective cycle time for this memory system is in the 300–400 nsec. range for the described examples. The effective cycle time is reduced from what would appear to be faster access in the data cache, since to resolve a miss in the data cache, and actually access the main RAM requires approximately 1-2 microsec. because of the serial accessing. With the above described memory, for each context switch, the ATU cache must be reprogrammed, thus further reducing the speed of the memory system where context switching is required.

As will be seen, the present invention employs only one type of memory for data storage (e.g., dynamic RAMs) without the equivalent of a data cache. An associative memory operation used to identify locations in RAM occurs in parallel with the accessing of portions of the RAM to accelerate the overall cycle time. Context switching can occur much more quickly than with prior art systems. The cycle time in the invented system is slightly slower than in the above-described virtual memory systems. However, because of numerous operation advantages the effective cycle time in many cases is faster without the complications inherent in prior art memory systems. For instance, the invented system has a guaranteed, constant cycle time (assuming the data is in memory). This is particularly important for "pinned" or "locked" pages.

SUMMARY OF THE INVENTION

A memory system for use in a digital computer is described. The memory itself comprises a plurality of RAMs which store digital signals for the computer's processing means or like means. A plurality of tag storage memories are used for storing information relating to the locations of information stored in the RAMs. These tag storage memories are programmed from the data bus. A plurality of comparators each of which is associated with one of the tag storage memories compares a first field and second field of digital signals, one received from the address bus and the other from the tag storage memories. The comparators' output signals indicate a set association used in selection of sets in memory. A hardware implemented "hash function" greatly reduces the likelihood of collision. This logic receives least significant bits of the segment, space and page offset of a universal or uniform address and provides a line address for the tag storage memories and RAMs. The invented memory system includes other unique features which shall be described in the body of the application, such as a hardware implemented page replacement algorithm. In general, the invented memory system provides equivalent (or better) performance over the more commonly used virtual memory systems without many of the complications associated with these systems.

DETAILED DESCRIPTION OF THE INVENTION

A random-access memory system for use with a digital computer is described. In the following description numerous specific details are set forth such as specific number of bits, etc., in order to provide a thorough understanding of the present invention. It will be obvious to one skilled in the art, however, that the present invention may be practiced without these specific details. In other instances, well-known circuits and processes have not been described in detail in order not to unnecessarily obscure the present invention.

For a discussion of the particular computer system in which the memory system of the present invention is employed, see co-pending application Ser. No. 602,154, filed Apr. 19, 1984, entitled "COMPUTER BUS APPARATUS WITH DISTRIBUTED ARBITRATION" and assigned to the assignee of the present invention.

BLOCK DIAGRAM OF FIG. 1

Figure 1:
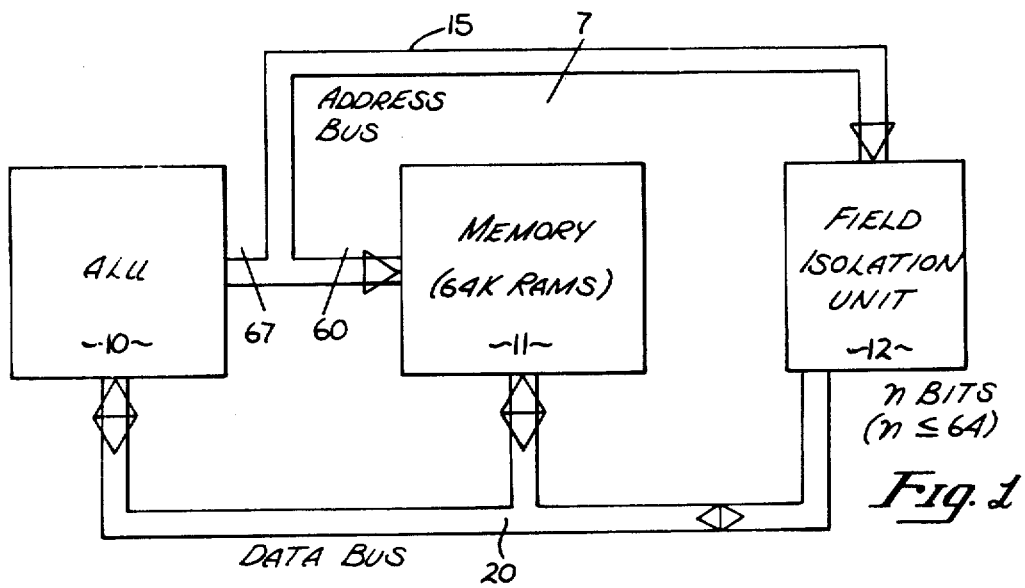
FIG. 1 is a block diagram illustrating the coupling of the invented memory system in a computer.

Referring first to FIG. 1, the memory system of the present invention is illustrated as memory 11 and field isolation unit 12. The memory 11 includes the RAMs (e.g., 64K "chips") which provide system storage and the circuits for accessing these RAMs. In the presently preferred embodiment, the memory system is used with an arithmetic logic unit 10 which provides a 67 bit address. 60 bits of this address are coupled to memory 11 and 7 to the field isolation unit (FIU) 12. The data bus 20 associated with the ALU 10 is coupled to the memory 11 and FIU 12. The remainder of the computer system associated with the ALU 10 such as input/output ports, etc., is not illustrated in FIG. 1.

The memory 11 in its presently preferred embodiment may employ one to four boards each of which stores two megabytes. The 60-bit address coupled to the memory 11 selects a 128-bit word which is coupled to the field isolation 12 over the bus 20. The 7 bits on bus 15 selects (isolates) 1 to 64 bits within the 128-bit word. Thus, the ALU 10 may address anything from a single bit to and including a 64-bit word. As presently implemented, the memory employs 64k dynamic NMOS "chips" for main storage, although other memory devices may be employed.

LOGICAL ADDRESS BIT DISTRIBUTION

Figure 2:
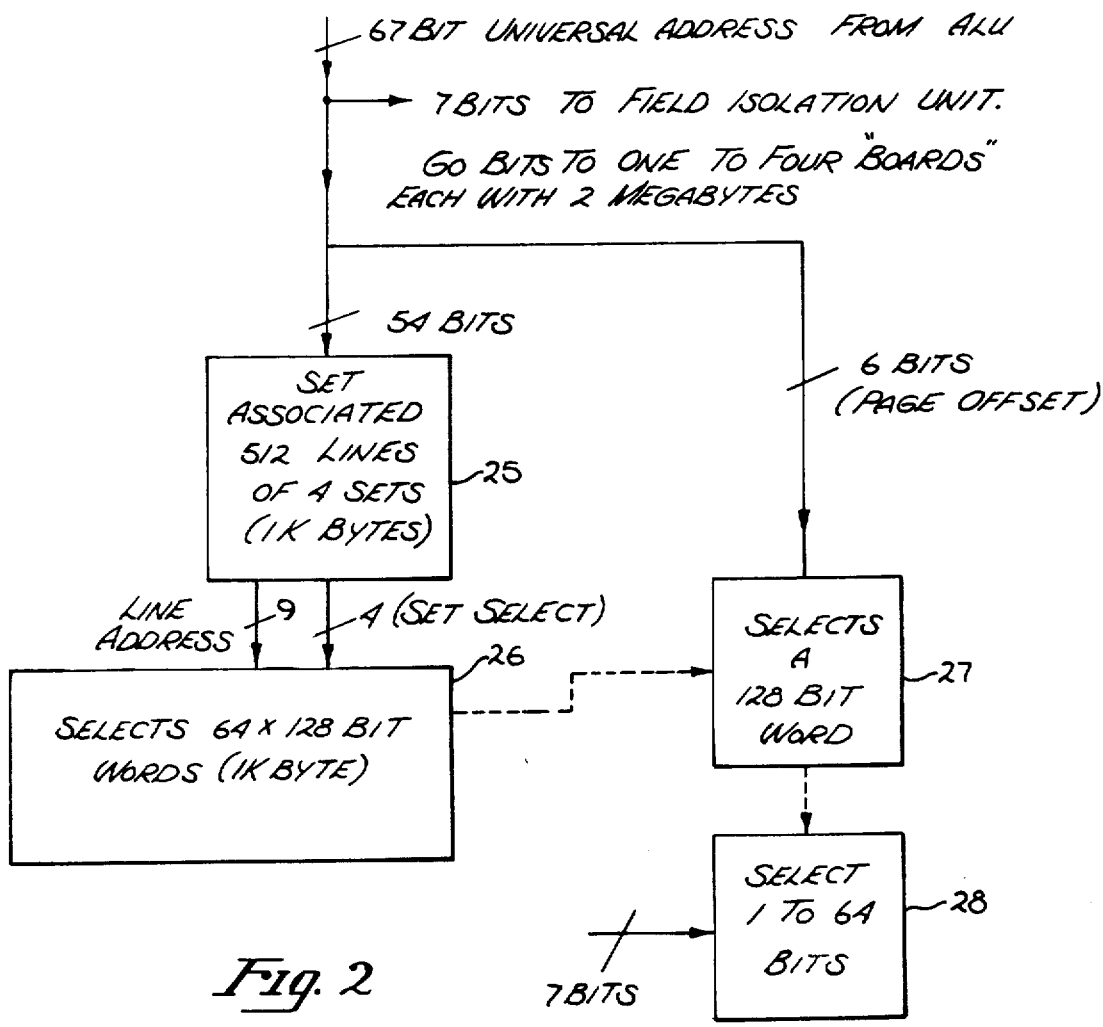
FIG. 2 is a block diagram used to describe the address bit distribution used in the presently preferred embodiment.

Referring to FIG. 2, the 67 bits of the universal or uniform address from the ALU are shown at the top of the figure. As discussed in conjunction with FIG. 1, 7 bits of this address are coupled to the FIU 12. The remaining 60 bits are coupled to the memory boards (one to four) within the memory system. Six bits of the 60 bits on each board are used for a page offset. Fifty-four bits are used for set association on each board (block 25). These bits identify one set on the boards by association; there are four sets on each board and 512 lines within each set. Eighteen bits of the 54 bits select from the 512 possible lines a 64×128 bit field (block 26). As illustrated by block 27, 6 bits (page offset) select a single 128-bit word from the 64×128 bits. Then from the 128 bits, a one to 64-bit word is selected by the 7 bits coupled to the FIU as illustrated by block 28.

In practice, 15 bits of the address begin accessing the RAM memory to select four 128-bit word sets on each board present in the system. Concurrently with this accessing, the set association occurs as illustrated by blocks 25, 26 and 27 of FIG. 2 to select a single 128-bit word from all of the 128-bit words selected by all the boards. Thus, the accessing of four 128-bit words on each board occur in parallel with the set association required to select a single 128-bit word.

Parity bits used throughout the memory system are not discussed or shown to prevent unnecessary complications in the description. These bits may be implemented using well-known circuits and techniques.

SET ASSOCIATION LOGIC

Figure 3:
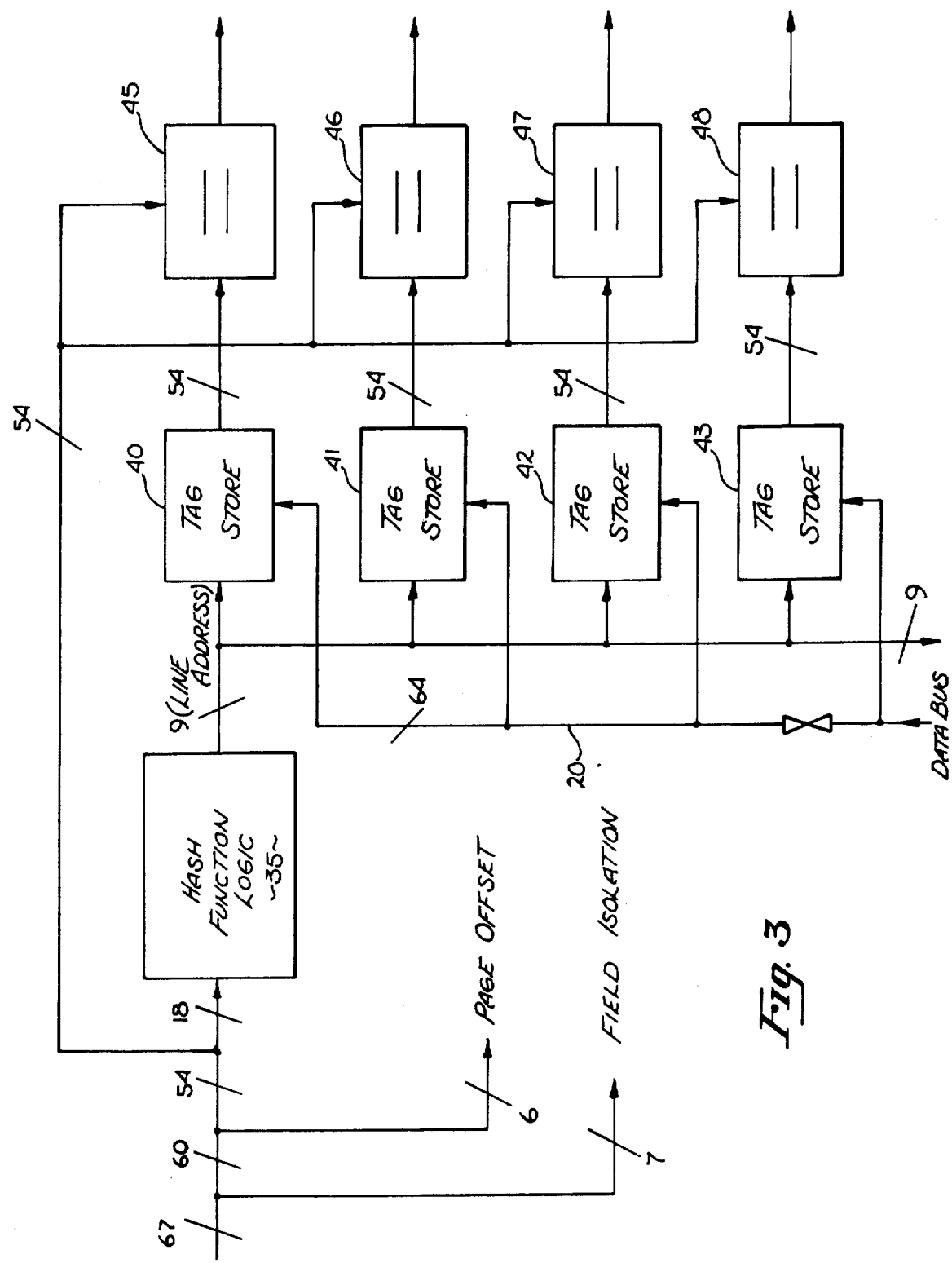
FIG. 3 is a block diagram of the portion of the invented memory system used for set association.

Referring to FIG. 3, the set association process on each board employs four tag store memories such as memories 40–43, and four comparators, one associated with each of the tag store memories shown as comparators 45–48 in FIG. 3. These tag store memories and comparators are duplicated on each of the memory boards. Each tag store memory is addressed by a 9-bit line number field and a four bit set number field not relevant to the present discussion, and provides a 54-bit output to its respective comparator. (A field of four additional bits occurs for the page replacement algorithm discussed later in addition to other outputs such as a parity bit.) This 54-bit tag value is compared in the comparators with a 54 bit field of address from the ALU. If the 54 bits from the tag store memory matches the 54 bits of the logical address, then an output signal from the comparator selects a 128-bit word. Tag values are written into the tag memories from data bus 20 and may be read on this bus.

As again can be seen in FIG. 3, 7 bits of the 67 bits of the physical address are used for field isolation, 6 bits for the page offset, and 54 bits are coupled to the comparators. Eighteen bits are coupled to a hash function means 35 which is discussed in conjunction with FIGS. 4a and 4b. The output of this means are the 9 bit line address field used to address both the tag store memories and the RAMs.

In the preferred embodiment there are two tag storage memories and two comparators per board. Each pair is used twice per memory cycle. For purpose of explanation, four (4) separate memories and comparators are illustrated.

HASH FUNCTION LOGIC

Figure 4A:
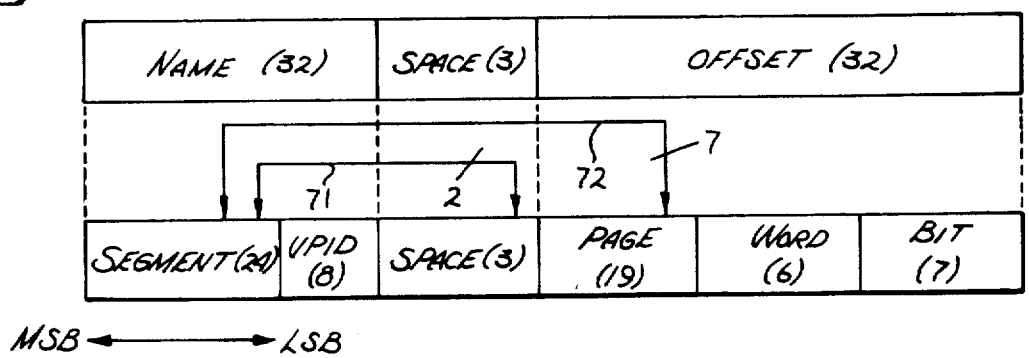
FIG. 4a is a diagram used in describing the hash function used in the presently preferred embodiment.

In FIG. 4a, the universal or uniform address from the ALU is shown as comprising a 32 bit name, a 3 bit space field, and a 32 bit offset. The name is further implemented as a 24 bit segment and a 8 bit virtual processor identification (VPID). The page offset includes a 19 bit page field, a 6 bit word field, and finally, 7 bits which are used to isolate a 1–64 bit field from a 128 bit word.

In a typical application, the more significant bits of the segment and page and the most significant bit of the space field will vary very little. And, in contrast, the least significant bits of the segment, page and space field tend to vary a great deal. If the memory system is implemented without a hash function, the repeated variations of the least significant bits, particularly of the segment and page, will cause repeated collisons, that is, address lines within the RAM will not be available for many addresses. To reduce the probability of such collision, the hash function logic of FIG. 4b provides exclusive ORing of these highly varying, least significant bits.

Figure 4B:
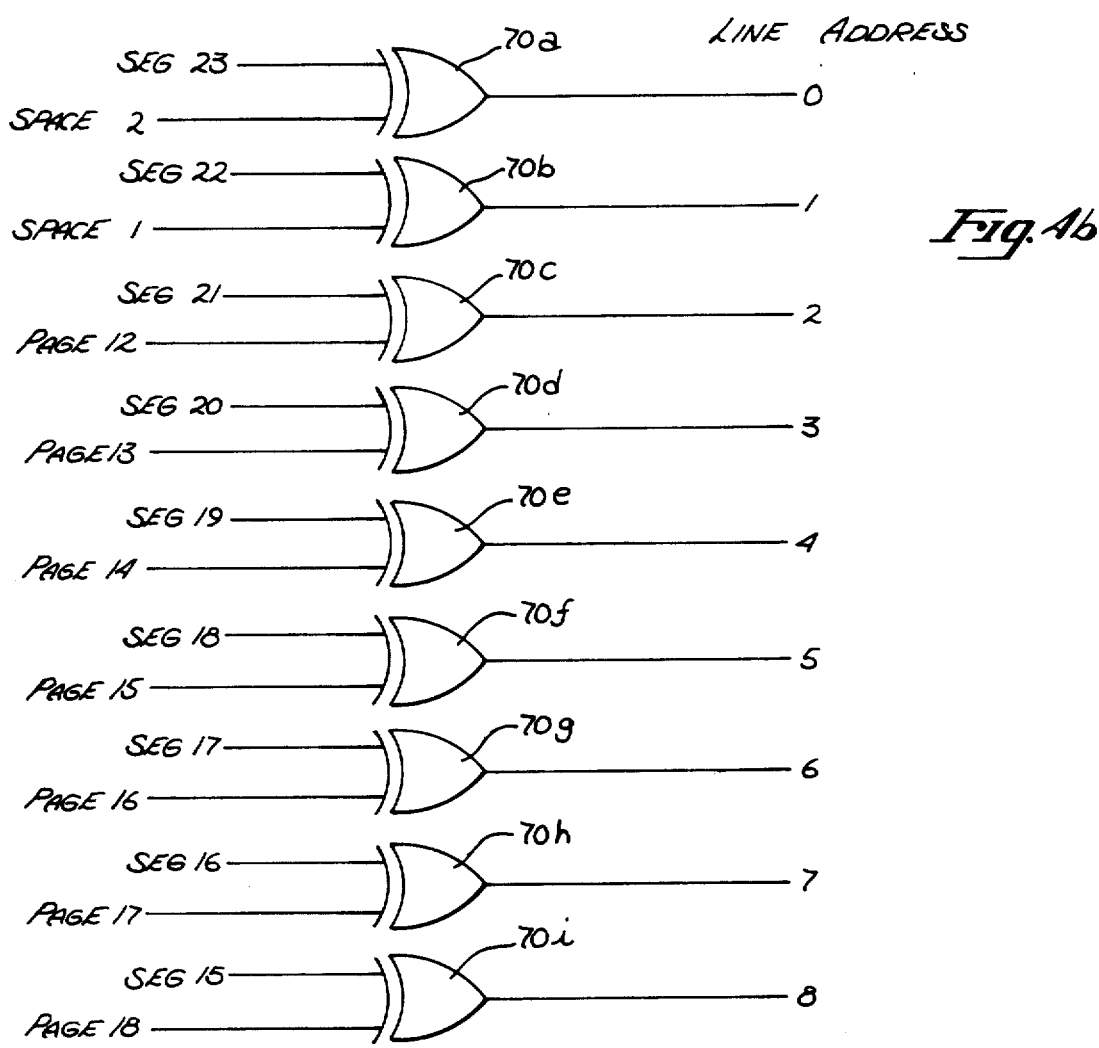
FIG. 4b is an electrical schematic of the hash function means used in the presently preferred embodiment.

The hash function logic of FIG. 3 comprises 9 exclusive OR gates, 70a through 70i, as shown in FIG. 4b. The exclusive OR gate 70a receives the segment address bit 23 and the space address bit 2, and provides the line address bit 0. Similarly, the exclusive OR gate 70b receives the segment address bit 22 and space bit 1, and provides the line address bit 1. This hashing is represented by line 71 of FIG. 4a. The gates 70c through 70i provide the segment/page hashing, and for instance, the gate 70c receives the segment address 21 and page address 12 and provides the line address 2. The remaining gates 70d through 70i receive the remaining least significant bits of the page address and segment address as indicated in FIG. 4b and provide the remaining line addresses 4-8. This hashing is represented by line 72 of FIG. 4a.

This exclusive ORing causes a wide dispersal, or mapping, of the most frequently used addresses, thereby reducing the probability of collision. It should be noted that the hash function is implemented in hardware, and substantially, no cycle time is lost in hashing the addresses. The delay associated with the exclusive OR gates 70a through 70i (e.g., 5 nanoseconds) is almost de minimus when compared to the cycle time of the MOS RAMs.

In some prior art memories, hash functions are implemented with software routines, and thus effectively, are performed in series with memory processing. This increases cycle time, thereby reducing the usefulness of the hash function.

PAGE REPLACEMENT ALGORITHM

The memory system includes a hardware implemented page replacement algorithm. It is used to identify least used lines when a collision occurs, allowing a page in RAM to be displayed.

As previously mentioned, a 4-bit field is associated with each line in each of the tag store memories. This field is used for implementing the page replacement algorithm. The memory value represented by these four bits is referred to as the least recently used (LRU) value. As will be seen, this value is unique in all sets for any given line.

When the memory system is addressed, two possible conditions can occur at the output of the comparators, such as comparators 45 through 48 of FIG. 3. Either no match occurs indicating that there is no location in memory corresponding to that address (no hit) or if a comparison occurs, this indicates a location exists in memory corresponding to that address (hit). The signal (and its complement) at the output of each comparator for these conditions is coupled to the circuit of FIG. 5 on lines 74 and 75.

Figure 5:
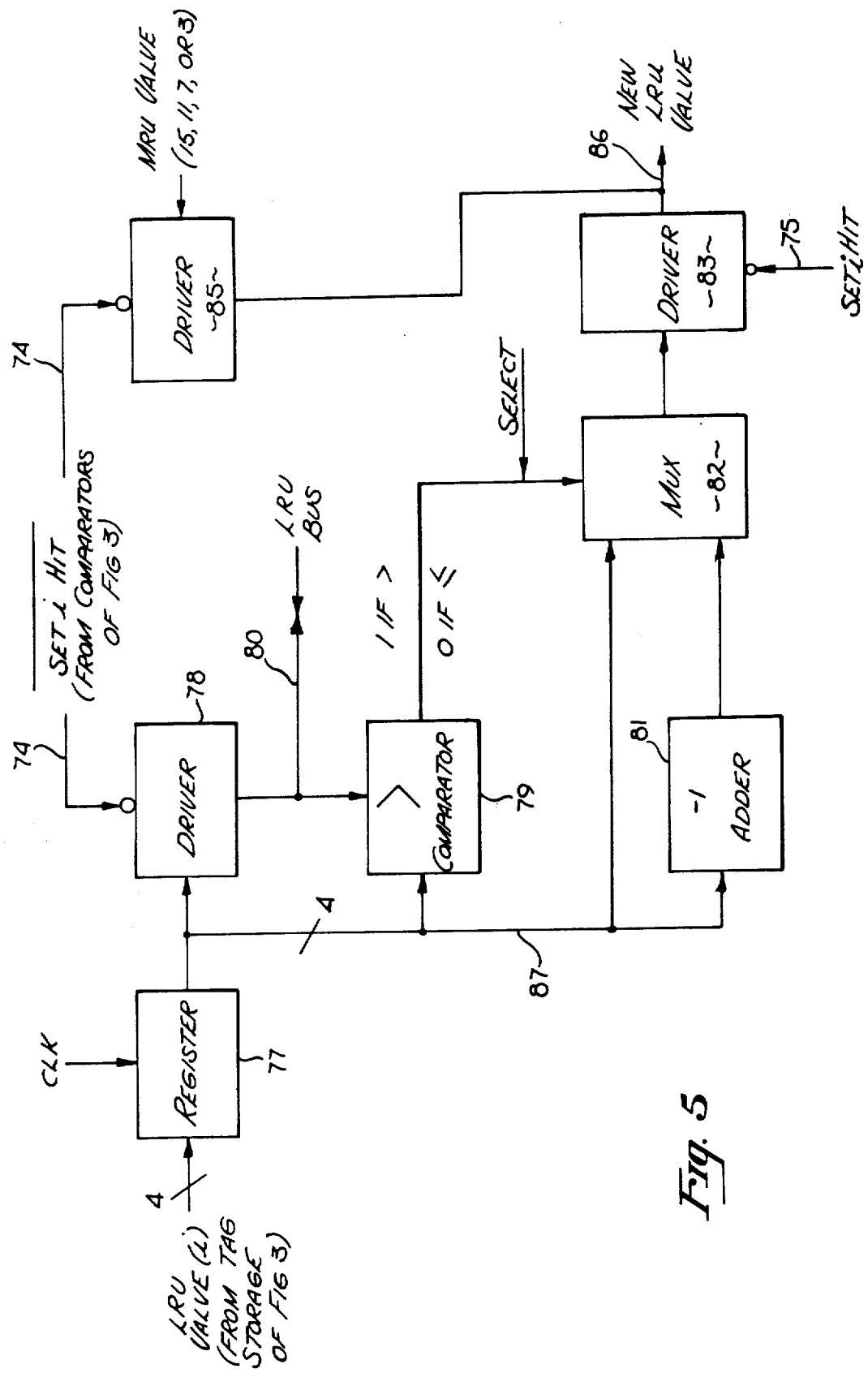
FIG. 5 is a block diagram of the hardware implemented page replacement algorithm.

The circuit of FIG. 5 is used to implement the LRU algorithm. For purposes of discussion, it will be assumed that the circuitry is repeated for each set, that is, up to 16 such circuits are used if four boards are employed. In actual practice, as was the case for the tag store memories and comparators, half this number of circuits is employed; each circuit is used twice per memory cycle.

Referring now to FIG. 5, the LRU value from the tag store memory is coupled to a register 77. A clocking signal applied to this register causes it to accept the 4 bit LRU value from the tag storage memory. The output of the register 77 is coupled to the driver 78, comparator 79, adder 81, and multiplexer 82. The "greater than" comparator 79 compares the two input signals to this comparator and provides a "one" output if the 4 bit digital number on bus 87 is greater than the number on bus 80, and conversely, a "zero" output if the number on bus 87 is equal to or less than the number on bus 80. A one at the output of comparator 79 causes the multiplexer 82 to select bus 87; otherwise, the multiplexer 82 selects the output of the "minus one" adder 81. The output of the multiplexer 82 is coupled to bus 86 through a driver 83 for a no-hit condition.

First, assume that a particular set contains the data for a particular address and thus, a hit occurs. The SET i Hit/signal on line 74 is low, and since it is coupled through an inverting input terminal of the driver 78, this driver is selected. The 4 bit LRU value for the selected set passes through the driver 78 and is broadcast to all the other sets on the LRU bus 80. At the same time, driver 85 is selected and the maximum value (most recently used) value is coupled through the driver 85 onto the bus 86. For four boards, this value is 15; for three boards, 11; for two boards, 7; and for one board, 3. The value is coupled to the tag store memory associated with the hit condition.

Assume now that the circuit of FIG. 5 is part of one of those sets which did not hit. Obviously, for this condition, the LRU value coupled to register 77 is not put on the bus 80 since the driver 78 is not activated. That is, only one LRU value, that corresponding to the hit set is put on the bus 80. The LRU value is coupled to the comparator 79, multiplexer 82, and adder 81. If the value on line 87 is greater than the LRU value for the hit set, this 4 bit value on bus 87 passes through the multiplexer 82, driver 83, and is restored into the tag store memory for that set. If, on the other hand, the value on bus 87 is less than, or equal to, the value on the bus 80, multiplexer 82 selects the output of the adder 81. The adder 81 subtracts 1 from the value on line 87 and this new LRU value is coupled through the multiplexer 82 and driver 83 and is placed back into the tag store memory. (In practice, adder 81 is a ROM used to also update the parity bit.)

Thus, as apparent, the circuit of FIG. 5, (i) for the hit set places in memory the maximum LRU value; (ii) if the stored LRU value is greater than the LRU value for the hit set, the stored value is returned to memory, and finally, (iii) if the stored LRU value is less than or equal to that of the hit set, it is decremented by 1 and restored.

If no hit occurs in any of the sets (collision condition), the set with an LRU value of zero is the least recently used set for the address line. This line is used (data replaced in RAMs) and the LRU value for this line is set to the maximum value and all the LRU values are decremented.

Initially, the LRU values for each line are set with a different value for each set based on a predetermined highest implemented set number. From analyzing the LRU values from the circuit of FIG. 5, it will become apparent that the LRU values are always unique. Thus, there will only be one set with a zero value LRU number.

It is important to note that the LRU algorithm is implemented in hardware and the LRU values are determined substantially in parallel while the memory is accessed. This eliminates the time required in some prior art memories to calculate new LRU values.

Referring again to FIG. 3, when the memory is to be accessed, ignoring for the moment the 7 bits to the field isolation unit, the 6 bits of the page offset and 9 bits for the line address, are immediately coupled to the memory since there is substantially no delay involved in the hash function logic means 35. These bits immediately begin accessing four 128 bit words on each board. While this is occurring, the tag store memories are addressed, and the comparison is completed within the comparators 45 through 48. The tag store memories are static memories and their cycle time is much shorter than that of the RAMs. Before the four, 128 bit words on each board are selected, the results of the comparison are completed, and assuming a hit condition occurs, one 128 bit word is coupled to the FIU. The 7 bits to the field isolation unit simply allow some or all of these bits to appear on the data bus, and the "setting up" for this isolation occurs during the time that the RAMs are being accessed. Consequently, the cycle for accessing the data or the like stored in the RAMs begins substantially when the address is available on the address bus with the set association performed through the tag storage memories and comparators occuring in parallel.

Thus, as mentioned, the cycle time of the memory is a known, constant time without the unusually long access times that occur in prior art systems, for instance, when the data is not located in the data cache. An important feature of the presently described memory is the fact that both the least recently used algorithm and hash functions are implemented in hardware in a manner that does not significantly increase access time, or require interaction with the ALU or CPU.

We claim:

1. In a digital computer system which includes processing means, an address bus, and a data bus, a memory system comprising:
   a plurality of random-access memories (RAMs) for storing data, said RAMs coupled to said data bus and said address bus;
   set association means coupled to said data bus and said address bus, said set association means coupled to receive an address signal from said address bus and providing a first field of digital signals for a set association determination, said first field also being coupled to said RAMs to access sets of digital signals stored in said RAMs;
   said processing means coupled to said data bus and said address bus for providing said address signals to said set association means;
   said set association means further providing a second field of digital signals for said set association determination;
   said set association means for providing a select signal to said RAMs for selecting one of said sets of stored signals from those accessed by said first field such that accessing of sets of locations in said RAMs by said first field and said set association determination of one of said sets by said first and second fields occurs substantially simultaneously;
   whereby simultaneous accessing of said RAMs with said set association provides more rapid cycle times for said memory system.

2. The memory system defined in claim 1 wherein said first field is derived from a subset of said address signals.

3. The memory system defined by claim 2 wherein said first field is derived from the implementation of a hash function, said hash function for hashing selective bits of said address signal for providing said first field.

4. The memory system defined by claim 3 wherein said hash function implementation further includes a plurality of exclusive ORing means for exclusively ORing selective bits of said address signal respectively.

5. The memory system defined by claims 1 or 4 including an offset field derived from said address signal for selecting a stored word from said selected set and a field isolation unit (FIU) for selectively isolating a field of bits from said selected word from said RAMs, said FIU being coupled to said address bus and said data bus.

6. In a digital computer system which includes processing means, an address bus and a data bus, a memory system comprising:
   a plurality of random-access memories (RAMs) for storing data, said RAMs coupled to said data bus and said address bus;
   set association means for determining set association, said set association means providing a first field and second field of digital signals, said fields being derived from address signals provided by said processing means on said address bus, said set association means being coupled to said data bus, address bus and RAMs;
   said processing means for providing address signals to said RAMs and said set association means such that said RAMs are accessed substantially at the same time by said first field as said set association means determines said set association, said first field selecting sets of stored signals in said RAM, said set association means comparing said first and second fields and providing a select signal to said RAMs for selecting one of said set of stored signals from those accessed in said RAMs by said first field;
   whereby substantially simultaneous accessing of said RAMs and said set association means determination provides more rapid cycle times for said memory system.

7. The memory system defined by claim 6 wherein said set association means further including circuit means for determining a least recently used (LRU) value used by said set association means for generating said select signal.

8. The memory system defined by claim 7 wherein said set association means includes a plurality of tag store memories and comparators for generating said select signal, said first field addressing said tag store memories and providing said second field from said tag store memories, and said second field being compared in said comparators with said first field.

9. The memory system defined by claim 8 wherein said LRU values are stored in said tag store memories.

10. The memory system defined by claim 9 further including coupling means for permitting one of said LRU values from one of said tag store memories to be selected for coupling to other of said tag store memories.

11. The memory system defined by claim 10 wherein said tag store memories are static memories and said RAMs are dynamic memories.

12. The memory system defined by claims 6 or 11 wherein said first field is derived from a subset of said address signals using a hash function, said hash function for hashing selective bits of said address signals to provide said first field.

13. In a digital computer system which includes processing means, an address bus and a data bus, a memory system comprising:
    a plurality of random-access memories (RAMs) for storing digital signals, said RAMs coupled to said data bus for receiving said digital signals and coupled to said address bus for receiving an address signal;
    a plurality of tag storage memories for storing information relating to locations of said stored digital signals in said RAMs, said tag storage memories coupled to said data bus for receiving said information and coupled to said address bus for receiving first address signals, wherein each tag storage memory provides second address signals;
    a plurality of comparator means, each of which is associated with one of said tag storage memories, for comparing said first address signals and said second address signals and for providing an output signal based on said comparison, said first address signals being received from said address bus, said second address signals being received from its respective tag storage memory, said output signals from said comparator means being coupled to said RAMs for selecting one of a set of digital signals stored in said RAMs;
    first address signals from said address bus being coupled to said RAMs for selecting sets of stored digital signals;
    whereby said tag storage memories and comparator means provide set association for identifying a set of said digital signals from said sets of stored digital signals stored within said RAMs.

14. The memory system defined by claim 13 wherein said first address signals access said RAMs at the same time said first address signals access said tag storage memories.

15. The memory system defined by claim 13 wherein said first address signals are a subset of address signals generated by said processing means, said processing means coupled to said data bus and said address bus.

16. The memory system defined by claim 13 including hash function means coupled to receive said first address signals from said address bus and for providing a hashed output to said tag storage memories to provide more randomized distribution of said stored digital signals in said RAMs for the more frequently used addresses from said processing means.

17. The memory system defined by claim 16 wherein said hash function means exclusively ORs selective bits of said first address signals.

18. In a digital computer system which includes processing means, an address bus, and a data bus, a memory comprising:
    a plurality of random-access memories (RAMs) for storing digital signals used by said processing means, said RAMs coupled to said address bus and said data bus for receiving said digital signals;
    a plurality of tag storage memories for storing information relating to locations of said stored digital signals in said RAMs, said tag storage memories coupled to said address bus and said data bus for receiving said information;
    a plurality of comparator means, each of which is associated with one of said tag storage memories for comparing a first field and a second field of digital signals and for providing an output signal based on said comparison, said first field of said signals being received from said address bus, said second field of said signals being received from its respective tag storage memory, said output signals from said comparator means being coupled to said RAMs for selecting a set of digital signals stored in said RAMs;
    circuit means for determining least recently used (LRU) values such that from said LRU values for each address applied to said tag storage memories it can be determined which set of locations within said RAMs was accessed the least, said circuit means making said determination of said LRU values simultaneously while said RAMs are being accessed;
    whereby said tag storage memories enable the identification of least used memory locations within certain address ranges.

19. The memory system defined by claim 18 wherein said circuit means, after an output signal from one of said comparator means selects a set of stored digital signals within said RAMs, broadcasts the one of said LRU value from said respective tag store memory, and wherein said LRU values in the other said tag store memories remain unchanged if said LRU values are greater than said broadcasted value, however, if said LRU values are less than or equal to said broadcasted value said stored LRU values are decremented, and wherein said circuit means causes said one LRU value broadcasted to be set to a predetermined value.

20. In digital computer system which includes processing means, an address bus, and a data bus, a memory comprising:
    a plurality of random-access memories (RAMs) for storing digital signals used by said processing means, said RAMs coupled to said address bus and said data bus for receiving said digital signals;
    a plurality of tag storage memories coupled to said data bus for storing information relating to locations of said stored digital signals in said RAMs, and each of said tag storage memories providing a second field output;

a first field derived from an address signal on said address bus;

a hash function means coupled to said first field and said tag memories, said hash function means for exclusive ORing selective bits of said first field and providing a hashed output to said tag memories, said hashed output for addressing said tag memories;

a plurality of comparator means, each of which is associated with each one of said tag memories, said comparator means for comparing said first field and said second field and generating a hit set as an output;

a circuit means coupled to said plurality of comparator outputs for selecting least recently used (LRU) value from said tag memories, said circuit for comparing LRU values stored in said tag memories to a LRU value of said hit set, wherein if said stored LRU value is greater than said hit set LRU value, said stored LRU value remain unchanged and if less than or equal to that of said hit set LRU value, said stored LRU value is decremented by one and restored;

said circuit means functioning substantially simultaneous to said address signal, wherein said address signal for accessing a set of locations in said RAMs and said comparator means accessing a particular set from a set of locations in said RAMs, whereby simultaneous accessing of said RAMs provides for more rapid cycle times for said memory system.

* * * * *